(12) United States Patent
White et al.

(10) Patent No.: US 6,539,968 B1
(45) Date of Patent: Apr. 1, 2003

(54) FLUID FLOW CONTROLLER AND METHOD OF OPERATION

(75) Inventors: William W. White, Sparks, NV (US); William H. White, Carson City, NV (US); Christopher B. Davis, Allen, TX (US); Nelson D. Smith, Larkspur, CA (US)

(73) Assignee: FuGasity Corporation, Sparks, NV (US)

( * ) Notice: Subject to any disclaimer, the term of this patent is extended or adjusted under 35 U.S.C. 154(b) by 0 days.

(21) Appl. No.: 09/666,039

(22) Filed: Sep. 20, 2000

(51) Int. Cl.[7] ................................................. G05D 7/06
(52) U.S. Cl. ..................... 137/10; 137/486; 137/487.5; 251/118; 73/861.52; 138/44
(58) Field of Search ........................ 73/861.52; 137/10, 137/486, 487.5; 138/44

(56) References Cited

U.S. PATENT DOCUMENTS

| | | |
|---|---|---|
| 2,666,297 A | 1/1954 | Skousgaard |
| 3,271,994 A | 9/1966 | Fournier et al. |
| 3,335,748 A | 8/1967 | Klemm et al. |
| 3,559,482 A | 2/1971 | Baker et al. |
| 3,570,807 A | 3/1971 | Sturman |
| 3,807,456 A | 4/1974 | Colletti |
| 3,814,541 A | 6/1974 | Dent et al. |
| 3,841,520 A | 10/1974 | Bryant et al. |
| 3,910,113 A | 10/1975 | Brown |
| 4,015,626 A | 4/1977 | Thordarson |

(List continued on next page.)

FOREIGN PATENT DOCUMENTS

| EP | 0468793 A2 | 1/1992 |
|---|---|---|
| EP | 0689040 A2 | 12/1995 |
| WO | WO 87/00267 | 1/1987 |

OTHER PUBLICATIONS

Sheriff, David, "Mass Flow Controller Features Digital Calibration," Solid State Technology, Feb., 1993, pp. 33–35, No. 6, Tulsa, OK, US.

Gallant, John, "Sensors offer fast response times," E.D.N.— Electrical Design News, May 25, 1989, pp. 55, 57, 58, 60, 62, 64, 66, 68, No. 11, Newton, MA, US.

MGB1000 Micro Gas Blender, Trace Analytical, Menlo Park, CA (Undated).

Mott Industrial, Porous metal flow restrictors. High strength. Wear Resistant. Clog free, Jun. 1997.

(List continued on next page.)

*Primary Examiner*—Michael Powell Buiz
*Assistant Examiner*—Ramesh Krishnamurthy
(74) *Attorney, Agent, or Firm*—Randall C. Brown; Timothy F. Bliss; Haynes and Boone, LLP (57) ABSTRACT

A fluid mass flow controller, particularly adapted for controlling mass flow rates of toxic and reactive gases used in semiconductor device fabrication, includes a control circuit connected to pressure sensors for sensing the differential pressure across a flow restrictor in the mass flow controller for controlling a valve to control the fluid mass flow rate to a setpoint. The control circuit compares the differential pressure with the downstream pressure at a measured temperature with a data set of a gas passing through the flow controller for a range of differential pressures and downstream pressures and adjusts the flow control rate accordingly. The flow controller is mechanically uncomplicated including a two part body for supporting the pressure sensors, a remotely controllable flow control valve and the flow restrictor. The flow restrictor may comprise an orifice or nozzle but preferably comprises a sintered metal plug having a predetermined porosity for the expected materials and flow conditions to which the flow controller will be exposed. Process gases to be controlled by the flow controller are tested to provide data sets of mass flow rates at selected temperatures for a range of differential pressures across a flow restrictor and a range of downstream pressures.

32 Claims, 5 Drawing Sheets

U.S. PATENT DOCUMENTS

| | | |
|---|---|---|
| 4,096,746 A | 6/1978 | Wilson et al. |
| 4,118,009 A | 10/1978 | Chmura |
| 4,203,465 A | 5/1980 | Rissi |
| 4,253,156 A | 2/1981 | Lisle et al. |
| 4,275,752 A | 6/1981 | Collier et al. |
| 4,315,523 A | 2/1982 | Mahawill et al. |
| 4,327,757 A | 5/1982 | Weevers |
| 4,406,161 A * | 9/1983 | Locke et al. ............ 73/863.52 |
| 4,462,915 A | 7/1984 | Friedman |
| 4,565,212 A | 1/1986 | Klein et al. |
| 4,576,043 A | 3/1986 | Nguyen |
| 4,589,440 A | 5/1986 | Panet |
| 4,687,020 A | 8/1987 | Doyle |
| 4,718,443 A | 1/1988 | Adney et al. |
| 4,741,359 A | 5/1988 | Siebald |
| 4,796,651 A | 1/1989 | Ginn et al. |
| 4,858,643 A | 8/1989 | Vavra et al. |
| 4,888,117 A | 12/1989 | Brown et al. |
| 4,904,285 A | 2/1990 | Yamada et al. |
| 4,918,995 A | 4/1990 | Pearman et al. |
| 5,003,810 A | 4/1991 | Jepson et al. |
| 5,052,363 A | 10/1991 | Stiles |
| 5,062,446 A | 11/1991 | Anderson |
| 5,080,131 A | 1/1992 | Ono et al. |
| 5,100,100 A | 3/1992 | Benson et al. |
| 5,100,551 A | 3/1992 | Pall et al. |
| 5,114,447 A | 5/1992 | Davis |
| 5,129,418 A | 7/1992 | Shimomura et al. |
| 5,142,483 A | 8/1992 | Basham et al. |
| 5,159,951 A | 11/1992 | Ono et al. |
| 5,161,576 A | 11/1992 | Hekkert et al. |
| 5,187,972 A | 2/1993 | DeFriez |
| 5,190,068 A | 3/1993 | Philbin |
| 5,280,773 A | 1/1994 | Henkel |
| 5,285,673 A | 2/1994 | Drexel et al. |
| 5,297,427 A | 3/1994 | Shambayati |
| 5,311,762 A | 5/1994 | Drexel |
| 5,325,705 A | 7/1994 | Tom |
| 5,329,966 A | 7/1994 | Fenimore et al. |
| 5,359,878 A | 11/1994 | Mudd |
| 5,419,133 A | 5/1995 | Schneider |
| 5,445,035 A | 8/1995 | Delajoud |
| 5,487,771 A | 1/1996 | Zeller |
| 5,511,585 A | 4/1996 | Lee, II |
| 5,542,284 A | 8/1996 | Layzell et al. |
| 5,549,272 A | 8/1996 | Kautz |
| 5,583,282 A | 12/1996 | Tom |
| 5,624,409 A | 4/1997 | Seale |
| 5,660,207 A | 8/1997 | Mudd |
| 5,730,181 A | 3/1998 | Doyle et al. |
| 5,804,717 A | 9/1998 | Lucas |
| 5,816,285 A | 10/1998 | Ohmi et al. |
| 5,865,205 A | 2/1999 | Wilmer |
| 5,868,159 A | 2/1999 | Loan et al. |
| 5,904,170 A | 5/1999 | Harvey et al. |
| 5,911,238 A | 6/1999 | Bump et al. |
| 5,917,066 A | 6/1999 | Eisenmann et al. |
| 5,918,616 A | 7/1999 | Sanfilippo et al. |
| 5,944,048 A | 8/1999 | Bump et al. |
| 5,970,801 A * | 10/1999 | Ciobanu et al. ......... 73/861.52 |
| 5,975,126 A | 11/1999 | Bump et al. |
| 5,988,211 A | 11/1999 | Cornell |
| 6,026,847 A | 2/2000 | Reinicke et al. |
| 6,080,219 A | 6/2000 | Jha et al. |
| 6,119,710 A | 9/2000 | Brown |
| 6,152,162 A | 11/2000 | Balazy et al. |

OTHER PUBLICATIONS

Mott Industrial, Mott Precision Porous Metal Flow Restrictors Engineering and Product Guide, 3/97.

Mott High Purity, Porous Metal Flow Restrictors, 6/96.

Redwood Microsystems, A New Generation of High Purity Gas Panels from Redwood Microsystems, Don't Replace Your Thermal Mass Flow Controllers, Eliminate Them. (Undated).

Redwood Microsystems, Flow–istor Specifications, 1996.

Redwood Microsystems, report.html@me210abc.standford.edu, Spring, Oct. 2, 1997.

R&D Magazine, Sep. 1997, "Back to Basics—Vacuum Technology," p.81.

Semiconductor International, "Innovative Gas Handling Technology" (Undated).

Drexel, Charles F., "Digital mass flow controllers," Solid State Technology, Jun. 1993, No. 6, pp. 73, 75, Tulsa, OK, US.

Cobb, Jr. James Stanley and Stutler, Stephen Charles, Defensive Publication for Variable Flow Restricting Apparatus, 857 O.G. 1039, published Dec. 24, 1968.

* cited by examiner

FLUID FLOW CONTROLLER AND METHOD OF OPERATION

FIELD OF THE INVENTION

The present invention pertains to a fluid mass flow controller, particularly adapted for controlling the flow of toxic or highly reactive gases used in the fabrication of semiconductor devices and the like and including a method of operation of the controller based on data which correlates controller operation with a fluid differential pressure across a flow restrictor part of the controller and the downstream fluid pressure viewed by the controller.

BACKGROUND

Some effort has been put forth to develop precision fluid mass flow controllers, particularly flow controllers for controlling the mass flow rates of fluids, such as toxic and highly reactive gases, of the type used in the fabrication of semiconductor devices, for example. In the field of semiconductor fabrication, various gases are used in etching and vapor deposition processes, which gases are toxic to humans and are also highly reactive when exposed to ambient atmospheric conditions, for example. Mass flow controllers have been developed which measure and control the flow rate of fluids of the above-mentioned type wherein the measurements are based on thermal properties of the fluids. Other fluid mass flow controllers have been developed which are based on measuring a pressure differential across a flow restrictor or orifice. The accuracy of prior art fluid mass flow controllers of the type in question here is inadequate for many applications of flow controllers.

Semiconductor fabrication processes may require the discharge of very precise quantities of fluids (primarily gases) into a process chamber. For example, flow rates ranging from as high as twenty liters per minute to as low as a few tenths of one cubic centimeter per minute (CCM) may be required. Moreover, the response time and stabilization rate of flow controllers used to control reactive gases in semiconductor fabrication may require that the controller be able to react to an "on" signal and be stable at the required fluid flow rate within 0.5 to 1.0 seconds. The process itself may last anywhere from a few seconds to several hours and the shutoff response time of the fluid flow controller is usually required to be less than one second. The ability for thermal based fluid mass flow controllers to react and stabilize at such rates is difficult to achieve.

Another problem associated with prior art fluid mass flow controllers of the general type discussed herein pertains to the requirements to calibrate the controllers for various process fluids. Prior art fluid mass flow controllers are typically calibrated using an inert or nontoxic calibration fluid which requires the development of conversion factors or conversion data sets. Since the use of toxic or highly reactive process fluids for calibrating each controller instrument is cost prohibitive and dangerous to operating personnel, prior art mass flow controllers are typically calibrated on an inert fluid, such as nitrogen or argon, or a fluid whose properties are similar to the properties of the process fluid to be controlled by the mass flow controller. This process of using calibration fluids and conversion factors introduces errors into the operation of the mass flow controllers, is time consuming and thus expensive. The inaccuracy of prior art mass flow controllers and the expense and time required to calibrate controllers during initial setup, as well as in replacement procedures, adds substantially to the cost of many manufacturing processes, including the fabrication of semiconductor devices, to the point that certain improvements in fluid mass flow controllers have been highly desired.

Accordingly, several desiderata have been identified for fluid mass flow controllers, particularly of the type used in manufacturing processes as described above. Such desiderata include controller accuracy within a few percent of controller setpoint (at least one percent is desired), operation at elevated or below "normal" temperatures and various positions or attitudes (i.e., right side up, sideways, or upside down), without loss of accuracy, such as experienced by thermal based mass flow controllers, accurate measurement and control over a wide range of flow rates, fast response time from turn-on to achieving stable flow conditions, economy of manufacture and uncomplicated modular mechanical structure to facilitate servicing the flow controller and to facilitate changing the flow controller out of the fluid flow distribution system for the manufacturing process. Other features desired in fluid mass flow controllers include no requirement to calibrate each complete controller instrument at the time of manufacture or recalibrate the instrument after servicing, the provision of a reliable easily interchanged flow restrictor or orifice part, ease of verification of the operability and accuracy of the flow controller after servicing or changeout of a flow restrictor, the ability to accurately control flow rates for a wide variety of toxic and/or reactive fluids, particularly the hundreds of fluids in gaseous form which are used in semiconductor fabrication processes, and ease of changing the controller working data for flow rates for different gases or fluids in liquid form. It is to these ends that the present invention has been developed.

SUMMARY OF THE INVENTION

The present invention provides an improved fluid mass flow controller and method of operation. In particular, an improved mass flow controller and method of operation are provided for use in connection with controlling the flow of gaseous fluids used in the manufacture of semiconductor devices and the like.

In accordance with one aspect of the present invention, a fluid mass flow controller is provided which utilizes measurements of differential pressure across a flow restrictor and the pressure downstream of the flow restrictor to provide a more accurate reading of the actual mass flow of a particular fluid at a particular temperature. Such measurements may be carried out using only two pressure sensors or transducers and over a wide range of temperatures of the fluid being measured.

The present invention further provides an improved fluid mass flow controller, particularly adapted for controlling the mass flow rate of toxic and reactive gases, including those used in the fabrication of semiconductor devices wherein the flow controller includes rapid response time to stabilize at a desired setpoint flow rate and is accurate within setpoint conditions to less than one percent error. The controller is also operable to measure mass flow rates over a wide range of such flow rates, on the order of a ratio of maximum to minimum flow rates as great as 100 to 1. The mass flow controller does not require calibration with a process fluid or with a calibration fluid and thus no conversion factors are required in the flow measurement process.

The present invention also provides an improved fluid mass flow controller which operates by measurement of fluid differential pressures across and the fluid pressure downstream of a flow restrictor and which utilizes data for the mass flow of selected fluids within a range of differential pressures and downstream pressures to which the controller will be exposed and in which the controller will be operated. The mass flow controller and flowmeter of the invention is also operable over a wide range of inlet pressures from above atmospheric pressures to vacuum conditions experienced with so-called safe delivery systems for toxic or reactive gases. Still further, the invention includes a fluid mass flow controller which is operably associated with a control system including a suitable processor circuit, such as a digital signal processor, a nonvolatile memory for storing the aforementioned data and which may receive additional sets of data when desired.

The present invention further provides a fluid mass flow control apparatus which is of mechanically uncomplicated construction, is modular in form and is particularly adapted for rapid changeout of a replaceable flow restrictor, one or more pressure transducers and a single flow control valve associated with the controller.

The present invention still further provides a flow restrictor for which data of flow versus differential pressure and downstream pressure are available as data sets for a multiplicity of fluids, particularly adapted for use with a pressure based fluid mass flow controller or flowmeter in accordance with the invention, but is adaptable for other applications and is adapted for use with toxic and reactive gases, in particular.

Still further, the present invention contemplates a method for measuring and/or controlling the mass flow rate of a fluid by measuring differential pressures across a flow restrictor and the fluid pressure downstream of the restrictor, and particularly, but not limited to operating conditions wherein the downstream pressure is below atmospheric pressure. The invention further contemplates a method of operation of a fluid mass flow controller which does not require calibration of the controller with calibration fluids but utilizes predetermined data sets for a flow restrictor part of the controller for various types of process fluids, including those which may be toxic or highly reactive.

The invention also contemplates a fluid mass flow controller including a microcontroller or processor device adapted to receive signals from two pressure sensors, a temperature sensor and command signal inputs while providing a suitable analog output signal for a control valve associated with the fluid mass flow controller. Still further, the microcontroller is operable to support RS485 communication and various network communications for receiving data from a remote site and for supporting and inputting data to a serial EEPROM. Accordingly, the invention contemplates a method of operation of a fluid mass flow controller wherein data sets characterizing a flow restrictor for different fluids may be obtained remotely via a network for rapid change in operation of the controller on various types of fluids.

Those skilled in the art will further appreciate the above-mentioned advantages and superior features of the invention together with other important aspects thereof upon reading the detailed description which follows in conjunction with the drawings.

DETAILED DESCRIPTION OF PREFERRED EMBODIMENTS

In the description which follows, like elements are marked through the specification and drawings with the same reference numerals, respectively. The drawings may not necessarily be to scale and certain features may be shown in generalized or schematic form in the interest of clarity and conciseness.

Figures 1, 2, 3:
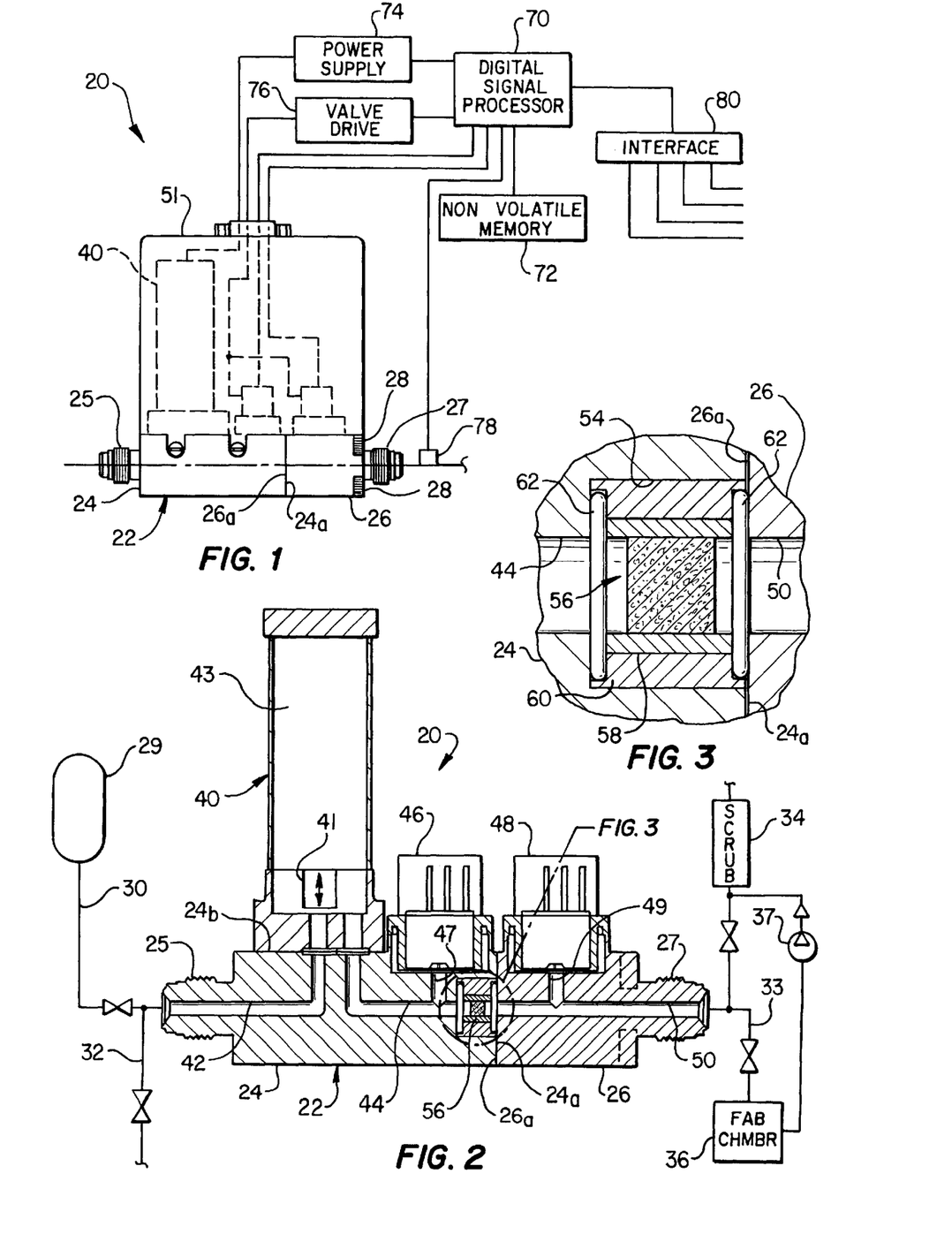
FIG. 1 is a somewhat schematic view of the fluid mass flow controller of the present invention.
FIG. 2 is a longitudinal, generally central section view of the controller shown in FIG. 1 and showing some features of fluid flow circuitry normally associated therewith.
FIG. 3 is a detail section view of a flow restrictor used in the flow controller of FIGS. 1 and 2 and in accordance with the present invention.

Referring to FIGS. 1 and 2, an improved fluid mass flow controller in accordance with the invention is illustrated and generally designated by the numeral 20. The mass flow controller 20 includes a two-part modular body 22 comprising generally rectangular block shaped body parts 24 and 26 which may be suitably joined to each other by conventional mechanical fasteners 28 at cooperating planar faces 24a and 26a, respectively. The body parts 24 and 26 are provided with suitable fluid conductor connector portions 25 and 27 to provide for connecting the fluid mass flow controller to conduits for a system for supplying, in particular, toxic or reactive fluids in gaseous form for use in semiconductor fabrication, for example.

By way of example, as shown in FIG. 2, the mass flow controller 20 may be interposed in a fabrication system including a source pressure vessel 28 for pressure fluid such as tungsten hexafluoride, chlorine, or sulfur hexafluoride, for example. Source pressure vessel 28 is connected to the flow controller 20 via a suitable conduit 30 and a purge conduit 32 is also connected to conduit 30 and to a source of purge gas, not shown, for purging the flow controller to a suitable receiver or scrubber 34, when needed. During operation of the flow controller 20, however, a precise flow of fluid is controlled for entry into a semiconductor fabrication chamber or vessel 36 via conduit 33. Chamber 36 is typically maintained at a substantially reduced pressure by way of one or more vacuum pumps 37, for example. The system in which the flow controller 20 is interposed, as shown in FIG. 2, is shown by way of example in simplified form to illustrate one preferred application of the flow controller.

Referring primarily to FIG. 2, the body part 24 supports an electrically controlled flow control valve 40 which is removably mounted on a face 24b of body part 24 by conventional mechanical fasteners, not shown. Valve 40 includes an electrically actuated closure member 41 operable to throttle flow of fluid from an internal passage 42 of body part 24 to a second internal passage 44 of body part 24. Valve 40 also includes an actuator 43 for the closure member 41. Actuator 43 is preferably of a type using a solenoid or piezoelectric material for rapid response and fineness of control of closure member 41. A first pressure transducer 46 is also removably mounted on body part 24 and is in communication with a passage 47 in body part 24 which is in communication with passage 44. A second pressure transducer 48 is removably mounted on body part 26 and is in communication with a passage 49 which opens into a longitudinal passage 50 in body part 26, which passage is also connected to conduit 33 leading to the fabrication chamber 36. Pressure transducers 46 and 48 may be of a type commercially available from Honeywell Data Instruments Division, for example. Control valve 40 and pressure transducers 46 and 48 may be disposed within a removable cover 51, FIG. 1, for the flow controller 20.

Referring also to FIG. 3, the body part 24 includes a cylindrical counterbore 54 formed therein and concentric with the passage 44 for receiving a flow restrictor 56. Flow restrictor 56 is supported in a tubular sleeve 58 which may be mounted in a suitable tubular adapter 60 supported in the counterbore 54 between seal rings 62. Accordingly, the flow restrictor 56 may be easily removed from the body 22 by separating the body parts 24 and 26, removing the flow restrictor together with its support sleeve 58 and replacing the flow restrictor with a suitable replacement restrictor of the same flow characteristics or a selected other flow characteristic. The flow restrictor 56 preferably comprises a sintered metal cylindrical plug shaped member having a predetermined porosity for allowing fluid to flow therethrough by providing restriction to flow sufficient to create a differential pressure thereacross which may be sensed by the pressure transducers 46 and 48. Flow restrictor 56 may, for example, be fabricated of stainless steel or nickel particles suitably compressed and sintered to provide the desired porosity and flow restriction characteristic. Flow restrictor 56 is advantageously disposed in flow controller 20 downstream of control valve 40.

Referring again to FIG. 1, the flow controller 20 is adapted to be operated by a control circuit or system including a microcontroller characterized as a digital signal processor 70 which is operably connected to a non-volatile memory, such as an EEPROM 72, a power supply 74 and a suitable valve driver circuit 76. The microcontroller 70 is operably connected to the valve 40 for effecting movement of the closure member 41 by way of the driver 76. The microcontroller 70 is also operably connected to the pressure transducers 46 and 48 and to a temperature sensor 78 which may be located to sense the temperature of fluid flowing through the controller 20 at a predetermined location. The microcontroller 70 is also operably connected to a suitable interface 80 for receiving command signals, data sets and programming changes from various sources.

The microcontroller 70 is preferably a TMS320 LF2407 fixed point microcontroller available from Texas Instruments Incorporated. The pressure sensors 46 and 48 operate in a plus/minus 0.5 volt range with fourteen to sixteen bit resolution as analog inputs to the microcontroller 70 which carries its own A/D and D/A converters. Other analog inputs will be for the temperature sensor 78 and a zero to five volt set point command signal input with twelve bit resolution. The microcontroller 70 also provides analog output signals for controlling operation of the valve 40 via the driver 76. Communication with the microcontroller 70 may be via an RS485 4-wire communication link and/or a CAN (Controller Area Network). The microcontroller 70 is also capable of supporting a JTAG interface for emulation and debug and a powerup bootloader function for programming. The memory 72 is preferably a serial EEPROM of at least four thousand bytes.

The microcontroller 70 requires a closed loop control function to be executed at a rate of about one hundred times per second between the inputs for the pressure sensors 46 and 48 and the output signal for controlling the valve 40. Communication through interface 80 is carried out while the control loop is functioning although new data transfer or transfer to the memory 72 may be supplied when control loop updates are not being maintained.

Figure 4:
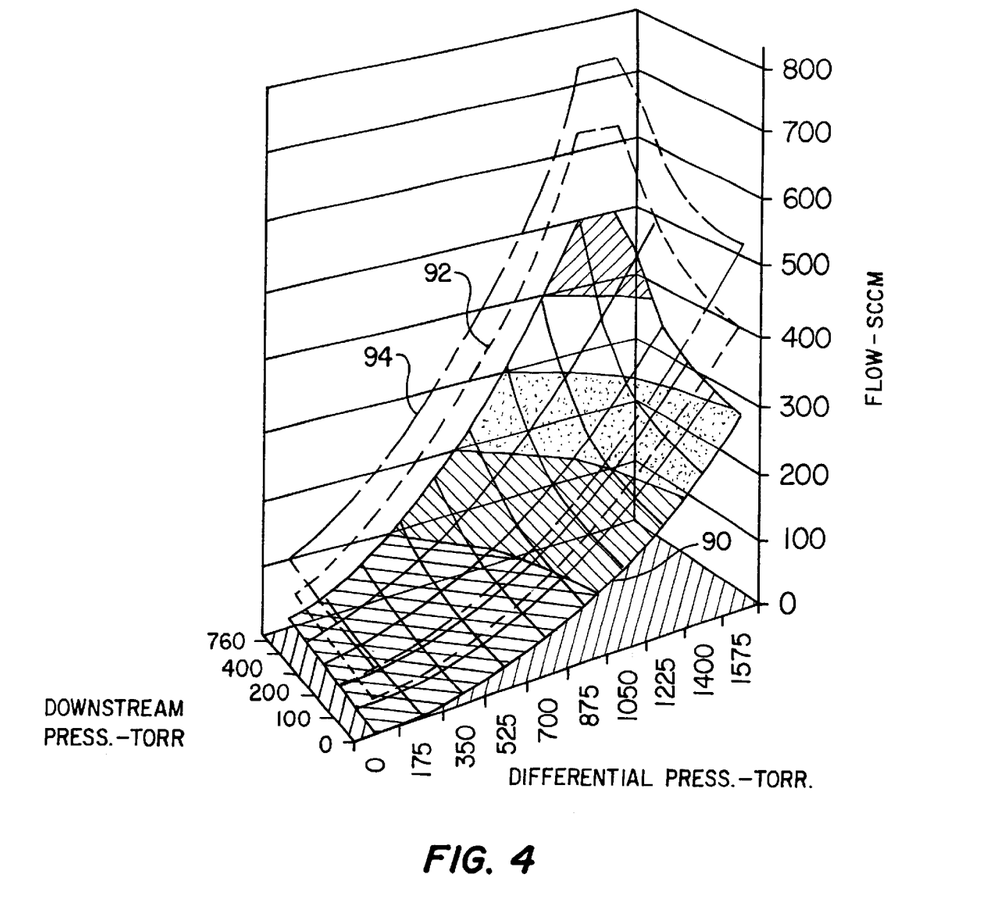
FIG. 4 is a diagram showing the mass flow rate of a gaseous fluid as a function of differential pressure across a flow restrictor and the downstream pressure, all in relatively low pressure ranges of about zero torr to about 2,000 torr.

An important aspect of the present invention resides in the discovery that, in a normal operating range of the mass flow controller 20, the fluid flow rate is a function not only of the differential pressure across the flow restrictor 56 but also the absolute downstream pressure corresponding substantially to the pressure in the fabrication chamber 36. FIG. 4, for example, shows a typical characteristic of flow in standard cubic centimeters per minute (SCCM) as a function of the differential pressure (torr) across the flow restrictor 56 and also as a function of the downstream pressure (torr) in the passage 50, conduit 33 and fabrication chamber 36. The diagram of FIG. 4 indicates that the flow characteristics of a fluid flowing across a restrictor, in the pressure ranges indicated in the diagram, may be in accordance with a three-dimensional surface indicated by numeral 90. The flow characteristic or surface 90 is for a particular temperature. In the diagram of FIG. 4, the mass flow characteristic 90 for the fluid tested was conducted at 25° C. As indicated in FIG. 4, measurements taken at lower temperatures would provide flow characteristics indicated by the surfaces 92 and 94, for example. The flow characteristic indicated by surface 92 is for a temperature lower than the temperature for the flow characteristic indicated by surface 90 and the flow characteristic which is determined by the surface 94 is at a temperature lower than the measurements taken for developing the flow characteristic surface 92.

It will also be noted from viewing FIG. 4 that a mass flow rate across a flow restrictor, particularly for the pressure ranges indicated in the diagram, varies with the downstream pressure. For example, if the downstream pressure is approximately 0.0 torr and the pressure differential across the flow restrictor is approximately 1575.0 torr, the flow rate for the particular restrictor tested is about 280 SCCM. However, if the downstream pressure is 760.0 torr (standard atmospheric pressure), the flow rate for the same pressure differential across the flow restrictor is approximately 500 SCCM. Accordingly, the behavior of fluids flowing across a flow restrictor, particularly in gaseous form, is dependent not only on temperature and differential pressure but also the pressure downstream of the flow restrictor.

The flow characteristics indicated in FIG. 4 at various temperatures, differential pressures across the flow restrictor and downstream pressures are for a sintered metal type flow restrictor, such as the flow restrictor 56. Alternatively, viewing FIG. 6, a similar flow characteristic is indicated for a sharp edged circular orifice at 25° C. and is indicated by numeral 95. The specific flow characteristics shown in FIGS. 4 and 6 are for nitrogen gas although other gases are indicated to behave in accordance with the general flow characteristics shown in FIGS. 4 and 6 for the types of flow restrictors described herein.

Figure 6:
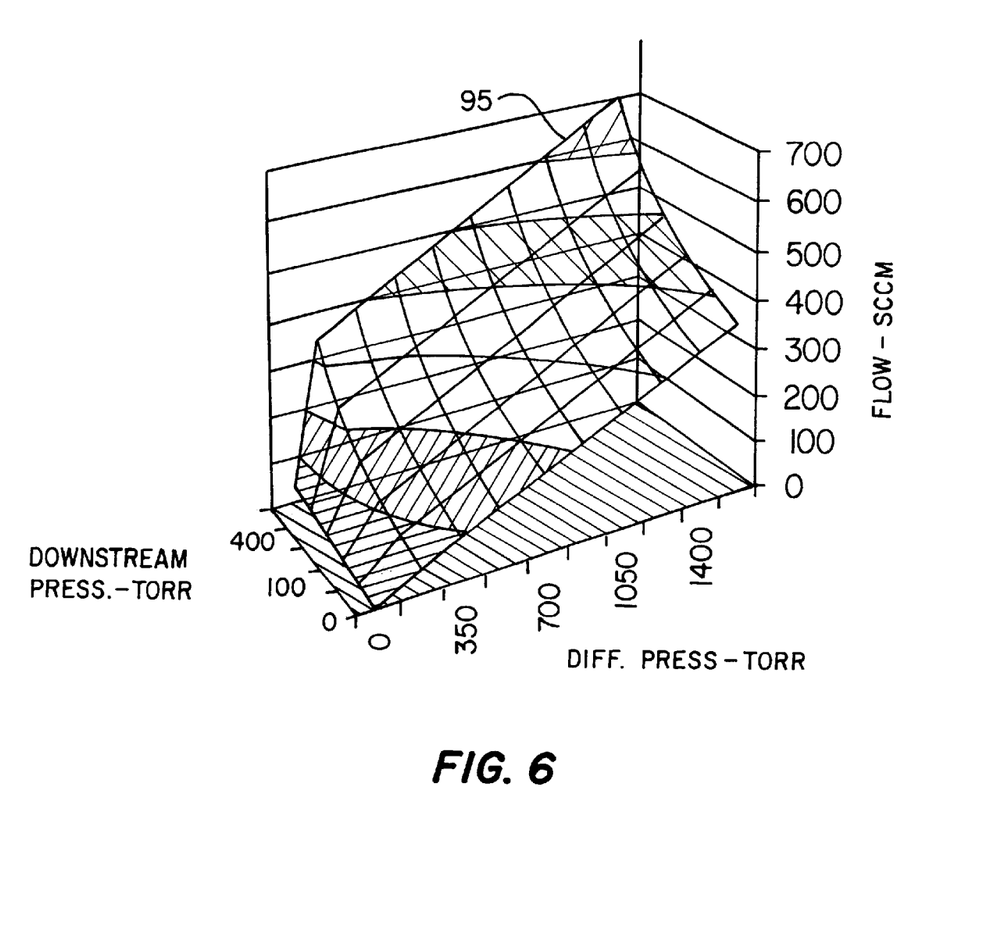
FIG. 6 is a diagram similar to FIG. 4 showing the characteristics of another type of flow restrictor as a function of differential pressure across and pressure downstream of the flow restrictor.

Accordingly, a flow characteristic in accordance with the diagrams of FIGS. 4 and 6 may be developed for particular types of flow restrictors used in connection with a mass flow controller, such as the controller 20, and for various fluids in liquid and gaseous form, including the process gases or vapors used in semiconductor fabrication.

Data points representing the three-dimensional flow characteristics, such as the surfaces 90, 92 and 94 in FIG. 4, may be developed in various ways and entered into the memory 72 of the flow controller 20. The flow controller microcontroller 70, when operated in a set point mode can be programmed to command operation of the valve 40 to adjust the flow through the flow controller 20 to approach the setpoint by sensing the pressure differential across the flow restrictor by the pressure transducers 46 and 48 to determine the actual flow rate, repeatedly, until the flow rate is essentially that programmed into the microcontroller 70 as the setpoint or pursuant to instructions input to the microcontroller. The data points representing the surfaces 90, 92 94 for a particular gas may be obtained using conventional flow measuring equipment.

A rate of change mass flow measuring apparatus may also be used to obtain the data points. Moreover, such a flow measuring apparatus may be used to verify the operation of a flow controller, such as the flow controller 20 within its design specification, and such apparatus may also be used to verify whether or not a particular flow restrictor is within its design specification. Once a design specification has been established for a flow restrictor and a flow controller of the types described herein, the performance of each may be verified by a rate of change mass flow measuring apparatus or other mass flow measuring apparatus or devices and use of an inert gas so that toxic and highly reactive gases are not required to be used during verification tests on the complete flow controller or on a flow restrictor, respectively. For example, a selected number of data points may be verified at flow rates of 50, 100, 500 and 3,000 SCCM at 30 psig inlet pressure, with exhaust pressure being atmospheric, for a flow controller, such as the controller 20, or for a flow restrictor, such as flow restrictor 56. Data points representing the design specification of the flow controller 20 may also be entered into the memory 72 to verify the operability of the flow controller when tested with the aforementioned rate of change flow measuring apparatus. A suitable rate of change or so-called rate of rise mass flow measuring apparatus is commercially available.

Moreover, the fluid mass flow controller 20 may also be connected via its interface 80 with a network adapted to be connected to a source of data for any fluid which has been tested in conjunction with a controller of the same type as the flow controller 20. In this way, any gas to be controlled by the flow controller 20 may have its flow characteristics entered into the memory 72 by merely querying a database stored in a suitable processor. For example, a vendor of the flow controller 20 may have selected data sets stored on a suitable processor and memory associated therewith for a wide variety of gases, each data set corresponding substantially to the type of data sets that would provide the flow characteristics shown in FIGS. 4 and 6 for any one type of flow restrictor, respectively. An authorized customer using a flow controller, such as the flow controller 20, and desiring to begin using the controller with a particular gas would merely make an inquiry to the vendor source and download the needed data set directly to the microcontroller 70 and its memory 72 via a network such as the Internet, for example.

Figure 7A:
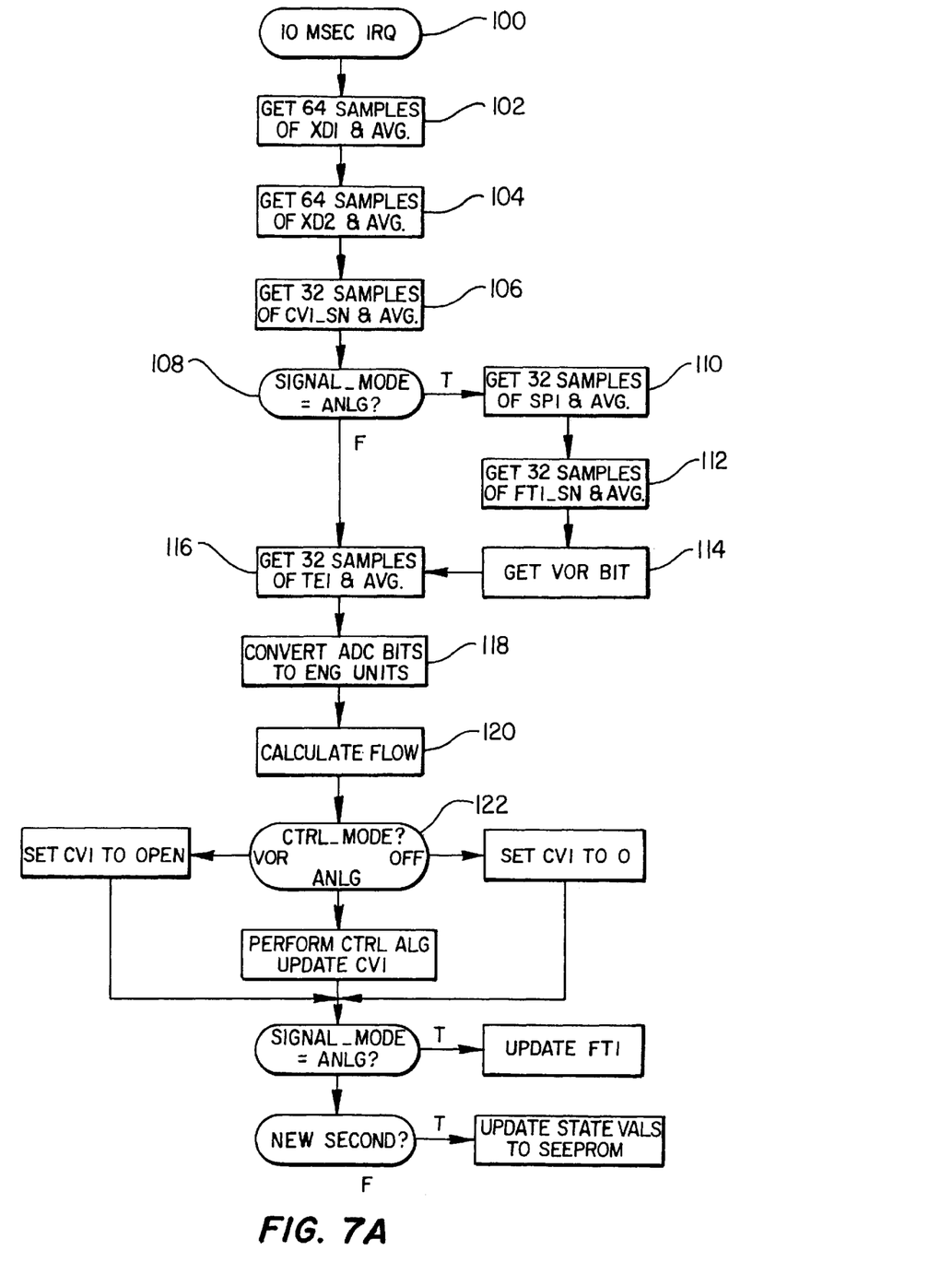
FIGS. 7A and 7B are flow charts of certain steps carried out in the operation of the fluid mass flow controller shown in FIGS. 1 and 2.

Operation of the microcontroller 70 is generally in accordance with the flow diagrams of FIGS. 7A and 7B and will now be described in further detail. The microcontroller or processor 70 is operable to execute closed loop control and communication functions. Closed loop control is preferably executed at a rate of 100 times per second and requires execution of lookup tables or polynomial calculations. All code may be written in "C". The functions of the microcontroller or processor 70 are summarized in the flow diagram of FIG. 7A. Step 100 in FIG. 7A indicates a 10 millisecond interrupt to drive the key functions of the processor 70. In step 102, the processor obtains 64 samples of downstream pressure XD1 and averages the samples. In step 104, the processor 70 obtains 64 samples of the upstream pressure XD2 and averages the samples. Step 106 is an averaging of 32 samples of an analog output signal for control of the valve 40 identified by the software tag CV1SN. Step 108 indicates operation of the processor 70 in the signal mode to obtain 32 samples of a zero to five volt setpoint command signal input in step 110, and a 32 sample zero to five volt analog output signal in step 112. Step 114 indicates when analog inputs are shorted to ground. Step 116 indicates the processor obtaining 32 samples of the signal from temperature sensor 78, indicated as TE1, and averaging such samples. Step 118 provides for converting the signal inputs to English units of pressure, flow and temperature. Step 120 in FIG. 7A is the execution of a calculation of flow routine using, for example, the surfaces 90, 92 and 94 of FIG. 4. New processor proceeds to the control mode at step 122.

Figure 7B:
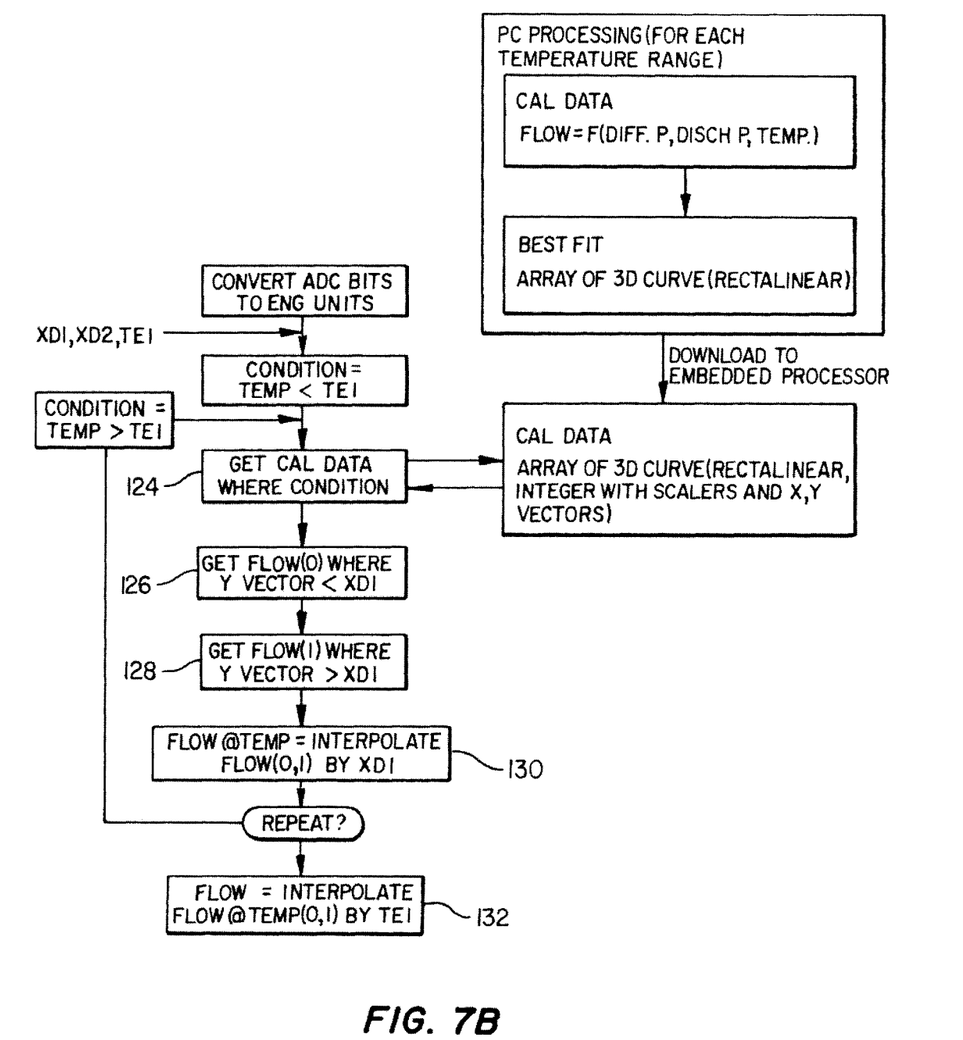

FIG. 7B illustrates how the calculation of flow routine is carried out using sets of so-called three dimensional maps, such as the surfaces 90, 92 and 94, for example, for respective operating temperatures and whereby the flow is calculated as a function of the variables of differential pressure across the flow restrictor 56, the downstream pressure in the flow passage 50 and the temperature sensed by the sensor 78. A set of flow runs over a range of downstream pressures and flow rates is obtained for the flow restrictor 56. This data set is fitted to an array of three dimensional curves. The so-called map can be thought of as flow on the z axis mapped to differential pressure, XD2−XD1, on the x axis and discharge or downstream pressure, XD1 on the y axis.

The best-fit process generates curves at various values of y. Typically curves of x versus z might be generated for XD1 being equal to 1, 50, 100, 300, 500 and 700 torr, for example. Then the process is repeated at another operating temperature. The calibration data is then mapped from floating point numbers to the fixed point quantities that are used in the processor. These tables are download to the processor and are called during the flow calculations. The get calibration data of step 124, FIG. 7B, is carried out by obtaining the calibration maps or surfaces at the nearest temperature above and below the temperature sensed by sensor 78. At steps 126 and 128, flow is calculated by interpolating the differential pressure XD2−XD1 for two curves in the calibration data (CAL DATA). Flow at the current calibration temperature is calculated by interpolating between calibration flow data points. At steps 130 and 132 flow at the current CAL DATA temperature is calculated by interpolating between Flow(0) and Flow(i) by the value of XD1 and the y axis values for Flow(0) and Flow(1). Flow is calculated by interpolating between the Flow@Temp(0) and Flow@Temp(1) by the value of TE1 and the temperatures for the two CAL DATA sets selected.

Figure 5:
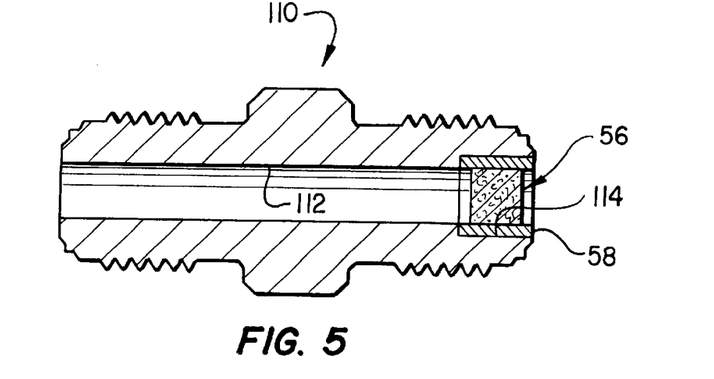
FIG. 5 is a longitudinal section view of another embodiment of the flow restrictor and an associated support fitting in accordance with the invention.

Referring briefly to FIG. 5, as previously mentioned the flow restrictor 56 may be adapted for operation in conjunction with other flow controllers and related devices. The flow restrictor 56 may, for example, be removably mounted in a conventional fitting, such as a face seal union fitting 110. The fitting 110 includes a longitudinal through passage 112 which is counterbored at one end to provide a bore 114 for receiving the cylindrical plug flow restrictor 56 and its tubular support sleeve 58. The sleeve 58 may be a light press fit in the bore 114. By way of example, a flow restrictor for use in conjunction with the flow controller 20 may be characterized as a cylindrical plug having a diameter of approximately 0.18 inches and a length of approximately 0.18 inches and may be formed of porous sintered stainless steel, nickel or Hastelloy C-22. The solid steel sleeve 58 may be formed of 316L stainless steel. It is contemplated that the manufacturing tolerances of the flow restrictor 56 may be such as to require only verification of the performance characteristics of the restrictor by verifying the mass flow rates of, for example, 50, 100, 500 and 3,000 SCCM at a pressure upstream of the restrictor of 30 psig with exhaust to atmosphere.

Accordingly, no calibration or calibration conversion factors are necessary for the flow restrictor 56 or the flow controller 20. When once placed in use, the flow controller 20 and/or the flow restrictor 56 may be verified as to its operability by flowing predetermined quantities of an inert gas through these devices using the aforementioned rate of change flow measuring apparatus or a similar apparatus to verify performance. The flow restrictor and/or the flow controller may then be placed in or returned to service with assurance that the respective devices will perform in accordance with a flow characteristic, such as that indicated in FIG. 4, for example.

The construction and operation of the mass flow controller 20 and the flow restrictor 56, as well as the method of operation of the flow controller as set forth hereinabove, is believed to be readily understandable to those of ordinary skill in the art. Moreover, the flow controller 20 functions as a flowmeter and may be used as a flowmeter as well as for controlling fluid flow rate to a setpoint condition.

Although preferred embodiments of the invention have been described in detail herein, those skilled in the art will recognize that various substitutions and modifications may be made to the invention without departing from the scope and spirit of the appended claims.

What is claimed is:

1. A fluid mass flow controller for controlling flow of fluid to a process, said mass flow controller comprising:
    a body including a fluid flow passage therein;
    a flow restrictor interposed in said flow passage in said body;
    a first pressure sensor for sensing the fluid pressure in said flow passage upstream of said flow restrictor and a second pressure sensor for sensing the fluid pressure in said flow passage downstream of said flow restrictor;
    a temperature sensor for sensing the temperature of fluid flowing through said mass flow controller;
    a control valve upstream of said flow restrictor for controlling the flow of fluid through said flow passage; and
    a control circuit operably connected to said control valve, said first and second pressure sensors and said temperature sensor for controlling the mass flow of fluid through said flow controller based on a differential pressure across said flow restrictor determined by the difference between the pressure sensed by said first and second pressure sensors respectively, said fluid pressure in said flow passage downstream of said flow restrictor, and said temperature of said fluid flowing through said mass flow controller.

2. The mass flow controller set forth in claim 1 wherein:
    said control circuit includes a microcontroller operably connected to said first and second pressure sensors, said temperature sensor, said flow control valve and to a memory including data specifying the mass flow rate through said flow restrictor for said fluid at least at one value of differential pressure across said flow restrictor, at least one value of pressure of fluid flowing downstream of said flow restrictor, and at least one value of temperature said microcontroller being operable to provide at least one of: (1) an output signal indicating a flow rate of said fluid through said flow controller at a particular differential pressure, downstream pressure and temperature and; (2) operating said control valve to limit the flow of said fluid through said flow controller to a predetermined amount based on a set point fluid flow rate communicated to said microcontroller.

3. The mass flow controller set forth in claim 2 including:
    an interface connected to said microcontroller and operable to be connected to a source for receiving a data set of fluid mass flow rates versus differential pressures across said flow restrictor and pressures downstream of said flow restrictor in said flow controller for at least one predetermined fluid composition at least at one predetermined temperature.

4. The mass flow controller set forth in claim 2 wherein:
    said microcontroller includes a data set residing in said memory for a verification fluid, said data set being used to verify flow control rates of said verification fluid at predetermined temperatures, differential fluid pressures across said flow restrictor and fluid pressures downstream of said flow restrictor.

5. The mass flow controller set forth in claim 1 wherein:
    said flow restrictor comprises a porous plug.

6. The mass flow controller set forth in claim 5 wherein:
    said flow restrictor comprises a sintered metal plug having a predetermined porosity.

7. The mass flow controller set forth in claim 6 wherein:
    said predetermined porosity of said flow restrictor corresponds to plural predetermined mass flow rates of a predetermined fluid at a predetermined pressure upstream of said flow restrictor, and a predetermined pressure downstream of said flow restrictor.

8. The mass flow controller set forth in claim 1 wherein:
    said body comprises a first body part and a second body part releasably connectable to said first body part at cooperating faces of said first body part and said second body part and said flow restrictor is mounted in one of said body parts in a counterbore formed therein and is removable therefrom upon separation of said body parts from each other.

9. The mass flow controller set forth in claim 8 wherein:
    one of said first and second pressure sensors is mounted on said first body part and the other of said first and second pressure sensors is mounted on said second body part, each of said first and second pressure sensors being in communication with a passage intersecting said flow passage in said body.

10. The mass flow controller set forth in claim 9 wherein:
    said control valve is mounted on said first body part and includes a closure member interposed in said flow passage.

11. The mass flow controller set forth in claim 1 wherein:
    said control circuit includes a microcontroller comprising a digital signal processor, a memory connected to said digital signal processor, a valve driver circuit interposed between said control valve and said microcontroller and an interface for connection to one or more networks for communicating at least one of data and commands to said microcontroller.

12. The mass flow controller set forth in claim 11 wherein:
    said memory includes a data set representing predetermined mass flow rates at a given temperature of a specified fluid over a range of differential pressures across said flow restrictor and a range of pressures in said flow passage downstream of said flow restrictor.

13. The mass flow controller set forth in claim 12 including:
plural data sets in said memory representing predetermined mass flow rates at a plurality of temperatures of said specified fluid over a range of differential pressures across said flow restrictor and a range of pressures in said flow passage downstream of said flow restrictor.

14. The mass flow controller set forth in claim 12 including:
plural data sets in said memory representing predetermined mass flow rates at a given temperature over a range of differential pressures across said flow restrictor and a range of pressures in said flow passage downstream of said flow restrictor, said plural data sets corresponding to a plurality of fluids of different compositions, respectively.

15. A fluid flowmeter for measuring the mass flow of a known fluid composition said flowmeter comprising:
a body including a fluid flow passage therethrough;
a flow restrictor interposed in said flow passage in said body;
a first pressure sensor for sensing fluid pressure in said flow passage upstream of said flow restrictor and a second pressure sensor for sensing fluid pressure in said flow passage downstream of said flow restrictor;
a temperature sensor for sensing the temperature of fluid flowing through said mass flow controller; and
a control circuit operably connected to said first and second pressure sensors and said temperature sensor for measuring the mass flow of fluid through said flowmeter based on a differential pressure across said flow restrictor determined by the difference between said fluid pressures sensed by die first and second pressure sensors respectively, said fluid pressure in said flow passage downstream of said flow restrictor, and said temperature of said fluid flowing through said mass flow controller.

16. The flowmeter set forth in claim 15 wherein:
said control circuit includes a microcontroller comprising a signal processor, and a memory connected to said signal processor, said memory including a data set representing mass flow rates at a given temperature of a specified fluid over a range of differential pressures across said flow restrictor and a range of pressures in said flow passage downstream of said flow restrictor.

17. The flowmeter set forth in claim 16 including:
plural data sets in said memory representing predetermined mass flow rates at a plurality of temperatures of said specified fluid over a range of differential pressures across said flow restrictor and a range of pressures in said flow passage downstream of said flow restrictor.

18. The flow meter set forth in claim 16 including:
plural data sets in said memory representing predetermined mass flow rates at a given temperature, over a range of differential pressures across said flow restrictor and over a range of pressures in said flow passage downstream of said flow restrictor, said plural data sets corresponding to a plurality of different fluids, respectively.

19. A flow restrictor for use in one of a flowmeter and a fluid mass flow controller for controlling relatively low flow rates of gaseous materials used in the fabrication of semiconductor devices, said flow restrictor being characterized by a data set of at least one of said gaseous materials for a range of differential pressures across said flow restrictor and a range of fluid pressures downstream of said flow restrictor and at least one temperature of said at least one of said gaseous materials, when said at least one of said gaseous materials is flowed through a passage having said flow restrictor interposed therein.

20. The flow restrictor set forth in claim 19 wherein:
said flow restrictor comprises a porous plug.

21. The flow restrictor set forth in claim 20 wherein:
said plug is formed of sintered metal.

22. The flow restrictor set forth in claim 20 wherein:
said flow restrictor is operable to provide plural predetermined mass flow rates of a verification gas flowed through said flow restrictor at a predetermined inlet pressure upstream of said flow restrictor and a predetermined exhaust pressure downstream of said flow restrictor.

23. A method for controlling the flow rate of a fluid to a process comprising:
providing a fluid mass flow controller having a body, a flow passage through said body, a flow restrictor interposed in said flow passage, a first pressure sensor for sensing fluid pressure upstream of said flow restrictor in said flow passage, a second pressure sensor for sensing pressure in said flow passage downstream of said flow restrictor, a temperature sensor for sensing the temperature of a fluid flowing through said fluid mass flow controller, and a control valve upstream of said flow restrictor for controlling the flow of said fluid through said flow passage and said flow restrictor;
measuring the pressures of said fluid flowing through said flow passage with said first and second pressure sensors;
determining a differential pressure across said flow restrictor based on the difference between the pressures measured by said first and second pressure sensors;
measuring the temperature of said fluid flowing through said fluid mass flow controller;
determining the mass flow rate of said fluid flowing through said controller based on said differential pressure across said flow restrictor, said pressure measured by said second pressure sensor, and said temperature measured by said temperature sensor; and
operating said control valve to vary the flow of fluid through said flow passage until the mass flow rate of fluid flowing through said flow passage is substantially at a predetermined setpoint of mass flow rate of said fluid.

24. The method set forth in claim 23 wherein:
said measuring of said pressures occurs in a range of about 760 torr to about 0 torr.

25. The method set forth in claim 23 wherein:
the mass flow rate of said fluid flowing through said flow passage is determined by comparing said differential pressure across said flow restrictor, said pressure measured by said second pressure sensor, and said temperature measured by said temperature sensor with a data set of predetermined mass flow rates based on various differential pressures of said fluid across a flow restrictor, various pressures of said fluid downstream of said flow restrictor, and a temperature at least proximal to said measured temperature.

26. The method set forth in claim 23 comprising:

comparing said differential pressure across said flow restrictor with said pressure measured by said second pressure sensor at said measured temperature.

27. The method set forth in claim 23 comprising:

obtaining data sets of flow rates of selected fluids to be controlled by said controller by flowing said selected fluids through said restrictor and measuring the upstream and downstream pressures at multiple downstream pressures and at multiple temperatures.

28. The method set forth in claim 27 including the step of:

measuring the flow rates of said fluids using a rate of change measurement apparatus.

29. A method for measuring the mass flow rate of a fluid, comprising:

providing a body including a flow passage and a flow restrictor interposed therein;

flowing said fluid through said flow passage and measuring the pressures of fluid flowing through said flow passage upstream and downstream of said flow restrictor;

measuring the temperature of said fluid flowing through said flow passage;

determining the differential pressure across said flow restrictor based on the difference between said pressures of fluid upstream and downstream of said flow restrictor; and comparing said differential pressure across said flow restrictor, said pressure downstream of said flow restrictor and said measured temperature with a data set of mass flow rates of said fluid being flowed through said flow passage for various differential pressures across said flow restrictor and various pressures of said fluid downstream of said flow restrictor at a given temperature that is at least proximal to said measured temperature.

30. The method set forth in claim 29 wherein:

said pressures downstream of said flow restrictor are in a range of about 0 torr to 760 torr.

31. The method set forth in claim 29 comprising:

providing a fluid mass flowmeter including said body, a first pressure sensor for sensing fluid pressure upstream of said flow restrictor in said flow passage and a second pressure sensor for sensing pressure in said flow passage downstream of said flow restrictor.

32. The method set forth in claim 29 comprising:

comparing said differential pressure across said flow restrictor and said pressure in said flow passage downstream of said flow restrictor with data sets of mass flow rates for selected temperatures above and below said measured temperature.

* * * * *